Aug. 2, 1960  G. W. KILLIAN  2,947,878
SWITCHING CIRCUIT
Filed April 15, 1959  2 Sheets-Sheet 1

INVENTOR.
GEORGE W. KILLIAN
BY
*Francis E Blake*
ATTORNEY

Aug. 2, 1960  G. W. KILLIAN  2,947,878
SWITCHING CIRCUIT

Filed April 15, 1959  2 Sheets-Sheet 2

INVENTOR.
GEORGE W. KILLIAN
BY
Francis E Blake
ATTORNEY

United States Patent Office 2,947,878
Patented Aug. 2, 1960

2,947,878

SWITCHING CIRCUIT

George W. Killian, Rochester, N.Y., assignor to General Dynamics Corporation, Rochester, N.Y., a corporation of Delaware Filed Apr. 15, 1959, Ser. No. 806,609

5 Claims. (Cl. 307—64)

This invention relates to switching systems and more particularly to an improved system for connecting the output of two power supplies to a load either singly or in parallel.

The invention herein disclosed is particularly adapted for use with equipment requiring a plurality of voltages wherein some of the auxiliary voltages are derived by conversion, transformation or rectification of other voltages. In such systems it is often desirable to provide the conversion, transformation or rectification equipment in duplicate in order to be able to materially reduce errors or shut down time, resulting from an auxiliary power supply becoming inoperative, by being able to switch into service the duplicate equipment. It is conventional in such systems for the operator or attendant to be able to select which equipment is to be used and for alarms to indicate failure of a power supply and other undesirable conditions.

It is the general object of this invention to provide a new and improved automatic switching system.

It is a more particular object of this invention to provide a switching system to selectively connect the output terminals of a first and second power supply to the load either singly or in parallel.

Another object of this invention is to provide a switching system which is capable of shifting the load from one power supply to another without any hiatus of power to the load.

Another object of this invention is to provide a switching system which will automatically shift the load from an inoperative, or failing, power supply to a duplicate power supply.

Another object of this invention is to provide a switching system which will avoid connecting two power supplies in parallel unless both power supplies are operative.

Another object of this invention is to provide a switching system which will reconnect the load to the first power supply if a transfer is initiated and the standby power supply is inoperative.

Another object of this invention is to provide a switching system which will cease its switching attempts if none of the power supplies are operative.

In accordance with the present invention a means is provided for shifting a load between either of two equivalent power supplies. A transfer may be initiated at the will of the operator, or automatically at predetermined times or intervals, or as a result of a failure of the supply which had been connected to the load. When it is desired to shift the load from one supply to another, and suitable conditions prevail, the incoming supply will be connected to the load in parallel with the outgoing supply prior to disconnecting the outgoing supply from the load; an operation which precludes the possibility of any hiatus of power to the load. Connecting the outputs of certain types of power supplies in parallel may damage paralleling contacts or equipment if both of said power supplies do not have the proper output voltage. For example, an inoperative power supply with a large filtering capacitor would appear as a short circuit if connected in parallel with an operative power supply. Consequently, the switching system herein disclosed is arranged to verify the presence of suitable output voltage of the power supplies prior to paralleling said supplies and to prevent their paralleling when suitable conditions do not prevail. The switching system is also arranged to restore the operating power supply to service if an attempt is made to switch the supplies and the incoming supply is inoperative. As an additional refinement, the switching system is designed to cease its switching functions and remove input power from the power supplies if neither power supply is operative.

Further objects and advantages of the invention will become apparent as the following description proceeds, and the features of novelty which characterize the invention will be pointed out in particular in the claims annexed to and forming a part of this application.

For a better understanding of the invention, reference may be had to the accompanying drawings which comprise two sheets of drawings, in which.

Figure 1:
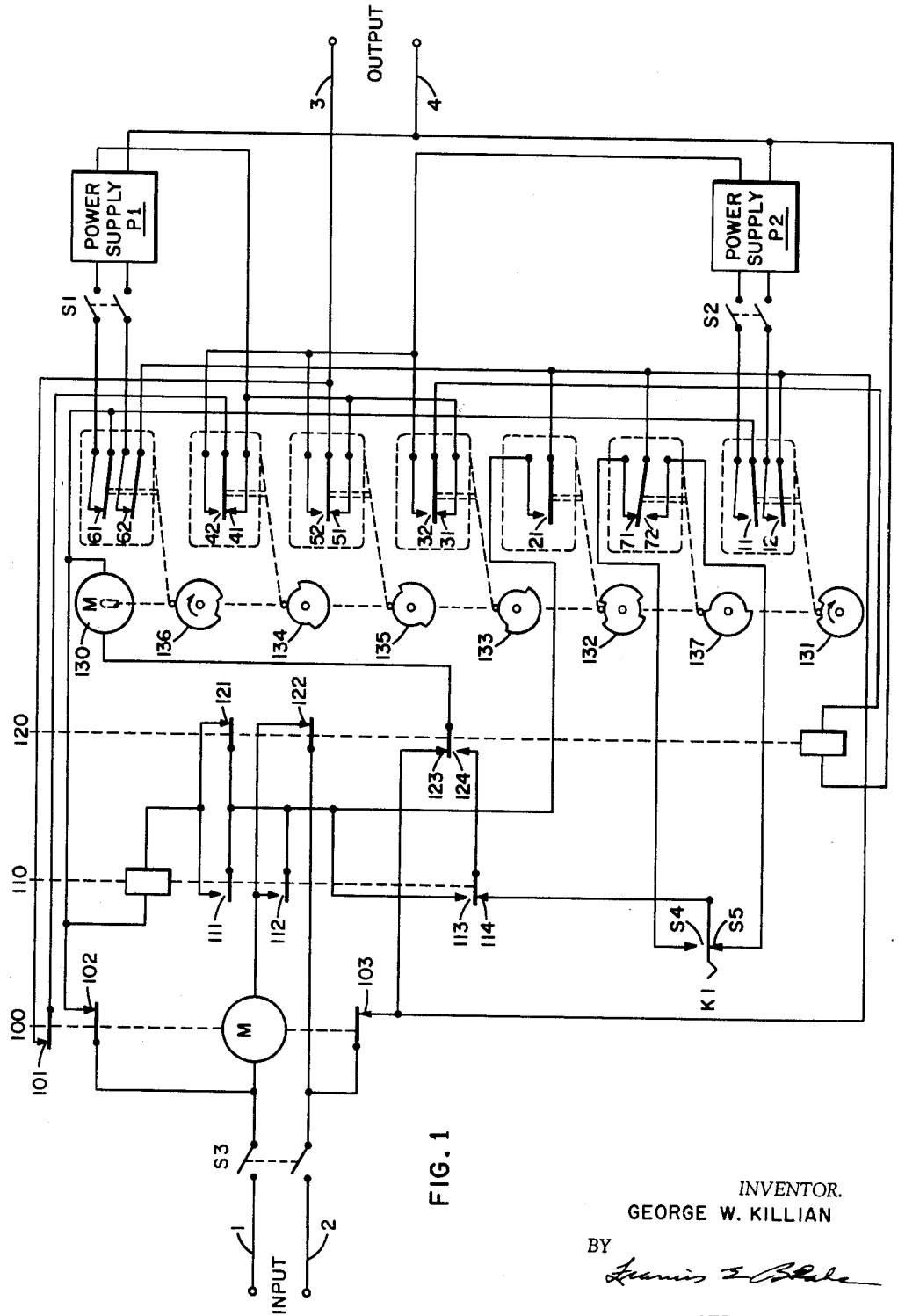
Figure 1 shows the circuit details.

It should be understood that only the details of the circuit necessary to understand the invention have been shown. For example, switches and fuses may be used in certain leads for convenience or safety, and in power supply systems wherein it would be considered undesirable to have one common output lead, as shown in Figure 1, the common lead could be switched by the same techniques employed for switching another lead.

It is believed that the operation of the system can best be understood by examination of the circuit together with an explanation to illustrate the means of shifting the load from one power supply to another.

Figure 2:
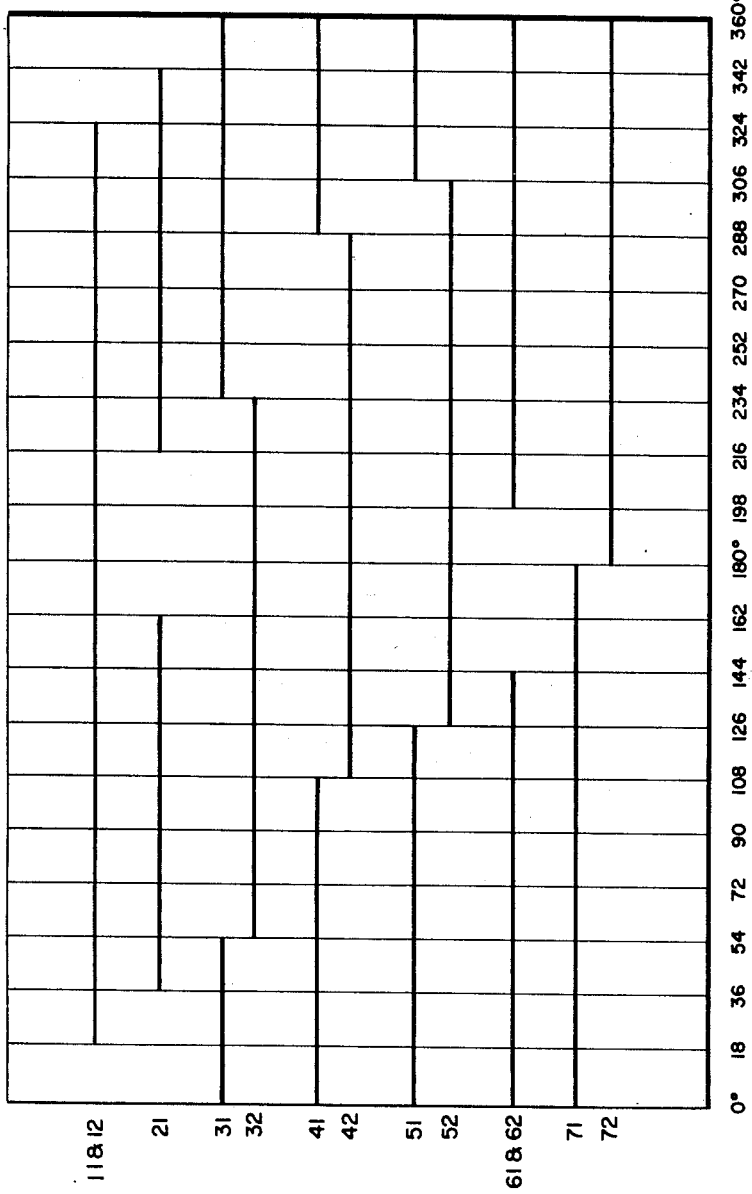
Figure 2 shows a timing chart indicating the sequence of operation of contacts associated with a sequence control means.

The input power to the system is supplied through leads 1 and 2 while the output power is available at the leads designated 3 and 4. Two power supplies which may be transformers, rectifiers or the like, are indicated as power supply P1 and power supply P2 with their input and output leads shown respectively at their left and right. The sequence control means 130 operates cams 131–137 to operate associated contacts in the sequence indicated in Figure 2. The sequence of operation of the various cam-operated contacts will control the switching of the circuit elements of Figure 1. While Figure 2 illustrates all cam-operated contacts as operating at multiples of 18°, it should be understood that it is the sequence of operation which is important and not the particular degrees of angular rotation between successive operations. However, it will be evident that sufficient time must elapse between successive contact operations to permit the required operation of the associated equipment. This time may vary according to the characteristics of the associated equipment. Suitable times may be obtained, in most cases, with 360° of cam rotation in approximately ten seconds.

Switch K1 may be used to cause a transfer of the load from one power supply to the other and these contacts may be operated in any suitable manner. For example, they may be manually operated or they may be operated by a time clock at predetermined times or intervals as may be desired. For the purpose of the present discussion any operation of switch K1 will be referred to as a manual operation. Timer 100 is provided with contacts 101 which operate promptly after the timer is energized while contacts 102 and 103 do not operate for an additional predetermined time interval which exceeds the time required for sequence control means 130 to complete a full cycle of operation. The switching system disclosed herein may be put into operation by any of the four following circumstances:

A. Manual transfer with standby providing power to the load.
B. Manual transfer with standby unable to provide power to the load.
C. Automatic transfer resulting from the failure of the connected power supply, with the standby providing power to the load.
D. Automatic transfer resulting from the failure of the connected power supply, with the standby unable to provide power to the load.

*Manual transfer with standby providing power to the load*

A transfer may be made from whichever power supply is operating to the standby power supply. The transfer may be initiated by an operation of switch K1.

Figure 1 illustrates the condition of the circuit with the contacts which are sequentially operated by sequence control means 130 in their proper position to allow power supply P1 to provide power to the load. Figure 2 in its 0° position matches Figure 1. Relay and timer contacts are shown in the conventional manner, that is, with the contacts in the released or deenergized condition of the relay or timer. Switches S1, S2 and S3 are provided for convenient disconnect of the equipment and would, of course, be closed during normal operation.

Power is supplied to the input terminals of power supply P1 as follows: from lead 1, upper contacts of switch S3, contacts 102 of timer 100, contacts 61 operated by cam 136 of sequence control means 130, upper contacts of switch S1 to one input lead to power supply P1, the other input lead to power supply P1, the other contacts of switch S1, contacts 62 also operated by cam 136 of sequence control means 130, contacts 103 of timer 100 and switch S3 to input lead 2. Power is being supplied to output terminals 3 and 4 as follows: from lead 3, contacts 51 operated by cam 135 of sequence control means 130 to the upper output lead of power supply P1, the lower output lead of power supply P1 to lead 4 at the output terminals. A circuit will be completed to operate relay 120 from the voltage present at the output of power supply P1 as follows: from the upper output lead of power supply P1, contacts 31 operated by cam 133 of sequence control means 130 to the coil of relay 120 and back to the lower output lead of power supply P1. The energization of relay 120 will open its associated contacts 121, 122 and 123 while contacts 125 will be closed.

The normally closed contacts 101 of timer 100 closes an alternate circuit for connecting the upper output lead of power supply P1 to output terminal 3 through contacts 41 operated by cam 135 of sequence control means 130.

A transfer may be initiated by opening switch contacts S5 and closing switch contacts S4 which will result in energizing the sequence control means 130 with power from the power source on input lead 1, switch S3, contacts 102 of timer 100, the motor of sequence control means 130, operated contacts 124 of relay 120, contacts 114 of relay 110, switch S4, contacts 71 operated by cam 137 of sequence control means 130, contacts 103 of timer 100 and switch S3 to input lead 2. Sequence control means 130 will commence to operate its associated contacts in the sequence illustrated in Figure 2 wherein a timing chart illustrates, by a line, the closed periods of the various contacts and the sequence of their opening and closing. It will be observed that the first action of the sequence control means 130 is to close contacts 11 and 12 which will close a circuit to apply input power to power supply P2 as follows: input lead 1, switch S3, contacts 102 of timer 100, contacts 11 operated by cam 131 of sequence control means 130, switch S2 to the upper input lead of power supply P2, the lower input lead to power supply P2, switch S2, contacts 12 also operated by cam 131 of sequence control means 130, contacts 103 of timer 100, and switch S3 to input lead 2. Power supply P2 will, if operative, provide voltage at its output terminals. The continued operation of sequence control means 130 will cause cam 132 to close its associated contacts 21 which have no effect at this time. The next contacts to be sequentially operated by sequence control means 130 are 31 and 32 which are opened and closed, respectively, by the motion of cam 133. The last-mentioned circuit change alters the connection of relay 120 such that it receives its operating current from power supply P2 rather than power supply P1 as had been the case. Relay 120 is energized by having the connection to the left side of the coil connected to the lower output lead of power supply P2 while the right side of relay coil 120 is connected to the upper output lead of power supply P2 through contacts 32 of sequence control means 130. Relay 120 is designed to remain operated for the brief time that is required for the changeover of contacts 31 and 32 of sequence control means 130. As sequence control means 130 continues to operate its associated cams, contacts 41 and 42 will be opened and closed, respectively, by cam 134. The closing of contacts 42 closes a circuit to connect the upper output lead of power supply P2 to lead 3 at the output terminals through contacts 42 and off-normal contacts 101 of timer 100. It will be observed that at this time the output leads of power supplies P1 and P2 are connected in parallel to the output terminals 3 and 4. The next contacts to be sequentially operated by the sequence control means 130 are 51 and 52 which will be opened and closed, respectively, by the motion of cam 135. The opening of contacts 51 disconnects the upper output lead of power supply P1 from output terminal 3. Power supply P2 is now singly connected to the output leads. The continued operation of sequence control means 130 will cause cam 136 to open its associated contacts 61 and 62 thereby removing the input power to power supply P1. Finally the sequence control means 130 will cause cam 137 to operate its associated contacts 71 and 72 opening the former and closing the latter thereby opening the circuit to deactivate or stop the sequence control means 130.

*Manual transfer with standby unable to provide power to the load*

The transfer described in the preceding section may be attempted at a time when the standby power supply is, for some reason, inoperative. Under such circumstances, the transfer will not succeed and the originally operating power supply will be restored to operation. The attempted transfer will start and proceed in a manner identical to that already described up to the point where sequentially operated contacts 31 and 32 open and close, respectively. The last-mentioned circuit change alters the connection of relay 120 such that it is connected to the output terminals of power supply P2 rather than to power supply P1 as had been the case. Inasmuch as it is presumed, for the purpose of this discussion, that the second power supply is inoperative the voltage responsive relay 120 will release thereby closing its associated contacts 121, 122 and 123 and opening contacts 124. The closure of contacts 121 will cause relay 110 to be energized over the following circuit: input lead 1, switch S3, closed contacts 102, the coil of relay 110, contacts 121, sequentially controlled contacts 21, contacts 103, switch S3 to input lead 2. It will be noted that relay 110 in operating closes its associated contacts 111 which are connected in parallel with contacts 121 of relay 120 to thereby hold relay 110 operated independent of relay 120.

The closure of contacts 122 of relay 120 serve to close the following circuit from input lead 1, switch S3, timer mechanism 100, contacts 122, switch S3 to input lead 2 thereby starting the timer. It will be observed that contacts 112 of relay 110 provide an alternate circuit to maintain an operating circuit to the timer with either relay 110 operated and contacts 21 closed or relay 120 released. The closure of contacts 123 are effective to shift the energizing circuit for sequence control means 130 in an obvious manner.

The off-normal contacts 101 of timer 100 which open responsive to the closure of the circuit to the timer open the following circuit: from the upper output lead of power supply P1 through contacts 41 and the timer off-normal contacts to output lead 3. The upper output lead of power supply P1 is still connected to output lead 3 to provide power to the load through sequentially controlled contacts 51.

Sequence control means 130 continues its operation and, as may be seen from Figure 2, the subsequent operation is that of contacts 41 and 42 which are opened and closed, respectively. The opening of contacts 41 is ineffective as timer off-normal contacts 103 are already open. The closing of contacts 42 was used, in the previously discussed case, to connect the outputs of the two power supplies P1 and P2 in parallel. However, the fact that relay 120 was released due to the lack of power at the output terminals of power supply P2 and the fact that off-normal timer contacts 103 are open prevents any parallel operation. The paralleling is avoided as with certain types of equipment, or with certain conditions prevailing, the operative power supply might be damaged if the two supplies are connected in parallel.

Sequence control means 130 will next operate contacts 51 and 52 opening and closing them, respectively, which causes power supply P1 to be disconnected from the load. Continued operation of sequence control means 130 will open contacts 61 and 62 to remove input power to power supply P1. Inasmuch as relay 120 is unoperted sequence control means 130 will continue to operate and thereby open contacts 21, which have no effect at this time. Note that relay 110 is held with energizing current through the following path: input lead 1, switch S3, contacts 102, the coil of relay 110, contacts 111 and 121 in parallel, contacts 112 and 122 in series, switch S3 to the input lead 2. The next contacts to be sequentially operated are 71 and 72 which have no effect at this time. Continued operation of sequence control means 130 causes contacts 61 and 62 to close to apply input power to power supply P1 as previously described. Contacts 21 of sequence control means 130 operate in turn, again with no effect. Finally sequentially controlled contacts 31 and 32 are opened and closed, respectively, and thereby operate voltage responsive relay 120 from the output terminals of power supply P1 through a previously traced circuit.

Operation of relay 120 shifts the energizing circuit of sequence control means 130 in a manner to cause its continued operation to be controlled by contacts 21. The operating circuit of sequence control means 130 is from input lead 1, switch S3, contacts 102, sequence control means 130 motor, contacts 124, contacts 113, contacts 21 and 103, switch S3 to input lead 2. Relay 110 is also held through contacts 21.

Power supply P1 is connected to the load when contacts 41 and 42 of sequence control means 130 open and close, respectively. Power supply P1 is connected to the load via an alternate circuit as contacts 51 and 52 open and close, respectively. The applicable circuits for connecting the power supply to the load are identical to those previously traced.

When contacts 21 are opened by sequence control means 130, a circuit will be opened to release relay 110 and stop sequence control means 130. The system has now reached a stable operating condition.

Should switch S4 and S5 be operated to close S4 and open S5 the stable condition will be shifted slightly. That is, by closing switch S4, sequence control means 130 will be energized over the following circuit: input lead 1, switch S3, contacts 102, sequence control means 130 motor, contacts 124 and 114 in series, switch S4, contacts 71 and 103, switch S3 to the input lead 2. The sequence control means will operate and sequentially open contacts 71 and close contacts 72, the former of which is effective to stop sequence control means 130 and provide a second stable operating condition.

*Automatic transfer resulting from the failure of the connected power supply with the standby providing power to the load*

As in the first case wherein a manual transfer was initiated, it will be assumed, for the purpose of this discussion, that power supply P1 is singly connected to the load. That is, all the sequentially operated contacts are originally opened or closed as shown in Figure 1, which condition is represented as the starting point of the timing chart of Figure 2. Also, of course, relay 120 is operated.

If it be assumed that power supply P1 becomes faulty or inoperative, its output voltage will fall below its normal value thereby releasing relay 120. Sequence control means 130 will be started responsive to the closure of contacts 123 of relay 120 receiving energy as follows: from the input lead 1, switch S3, contacts 102, the motor of sequence control means 130, contacts 123 and 103 in series, switch S3 to input lead 2. The closure of contacts 121 of relay 120 are ineffective at this time. The closure of contacts 122 of relay 120 close an obvious circuit to start timer 100. The off-normal contacts, 101, of timer 100 which open responsive to the starting of timer 100 serve to open one of the connections between the upper output lead of power supply P1 and the upper output lead to the load.

Sequence control means 130 will, as long as it is energized, cause its associated cams 131–137 to make and break their associated contacts in the sequence shown in Figure 2. As may be observed the first contacts to be operated are 11 and 12 which close and thereby supply input power to power supply P2 from input lead 1, switch S3, contacts 102, 11 and switch S2 in series to the upper input terminal of power supply P2, switch S2, contacts 12, 103 and switch S3 in series to input lead 2. Power supply P2 will commence to operate and will provide output voltage at its output terminals shown at the right of power supply P2. In their turn, contacts 21 are closed thereby closing a circuit to energize relay 110 as follows: from input lead 1, switch S3, contacts 102, the coil of relay 110, contacts 121, 21 and 103 in series, and switch S3 to input lead 2. It shosuld be observed that relay contacts 111 of relay 110 are in parallel with contacts 121 of relay 120 and that therefore relay 110 may hold operated independent of relay 120.

The closure of contacts 112 of relay 110 close an alternate circuit to timer 100.

Contacts 31 and 32 which open and close, respectively, are the next contacts of sequence control means 130 to be sequentially operated. The closure of contacts 32 closes a circuit to operate relay 120 from the power at the output terminal of power supply P2 which is presumed to be operative. As previously noted, the circuits to timer 100 and relay 110 have been made independent of contacts 121 and 122 of relay 120, therefore opening of the last-named contacts are ineffective at this time. The circuit to sequence control means 130 is shifted by the respective opening and closing of contacts 123 and 124. Contacts 21 are included in the new circuit to sequence control means 130 as follows: from input lead 1, switch S3, contacts 102, the motor of sequence control means 130, contacts 124, 113, 21 and 103 in series, switch S3 to input lead 2.

In their turn, sequentially operated contacts 41 and 42 are opened and closed, respectively, which does not affect any circuit at this time as the off-normal contacts of timer 100 are opened. In due course, sequence control means 130 operates contacts 51 and 52 which open and close, respectively. The opening of contacts 51 are effective to completely open the connection between the upper output lead to power supply P1 and output lead 3 to the load, while contacts 52 close a circuit between the upper output lead of power supply P2 and output lead 3 to the load. The common spring of the contact set 51 and 52 cannot be in contact with its front and back contact simultaneously and therefore the output leads of the two power supplies are not connected in parallel. Power supply P2 is now connected to supply power to the load.

Sequence control means 130 will next open contacts 61 and 62 which are effective to remove the input power from power supply P1. Finally sequence control means 130 will open contacts 21 which, as has been shown, are effective to open the circuit to relay 110 and timer 100 both of which restore to their released positions. The opening of contacts 113 by the release of relay 110 opens the circuit to sequence control means 130 which thereby ceases any further rotation. The system has now reached a stable operating condition.

Should switch S4 and S5 be operated to close S4 and open S5, the stable operating condition will be shifted slightly. That is, by closing switch S4, sequence control means 130 will be energized over the following circuit: input lead 1, switch S3, contacts 102, sequence control means 130 motor, contacts 124 and 114 in series, switch S4, contacts 71, contacts 103, and switch S3 to input lead 2. The sequence control means will operate and sequentially open contacts 71 and close contacts 72, the former of which are effective to stop sequence control means 130 and provide another stable operating condition.

*Automatic transfer resulting from the failure of the connected power supply with the standby unable to provide power to the load*

As with the preceding cases, it will be assumed, for the purposes of this discussion, that power supply P1 is singly connected to the load prior to the occurrence of the failure which initiates an automatic transfer.

The operation of the system resulting from failure of power supply P1 will be identical to that described in the previous section up to the time contact 31 closes. The action may be summarized as follows: relay 120 released due to lack of output power at the output terminals of power supply P1, timer 100 was started, input power was applied to power supply P2 and relay 110 was operated.

Since it is now being assumed that power supply P2 is inoperative, the closure of contacts 31 are not effective to operate relay 120. The operation of contacts 41 and 42 by sequence control means 130 are ineffective as the timer off-normal contacts are open. As previously described, the operation of contacts 51 and 52 are effective to shift the connection of output lead 3 from a connection with the upper output lead of power supply P1 to a connection with the upper output lead of power supply P2. However, since power supply P2 is presumed to have no output power, no power is provided to the load. The opening of contacts 61 and 62 are effective to remove input power from power supply P1. The opening of contacts 21 does not stop the sequence control means or release the timer 100 or the relay 110 as relay 120 has remained released. The circuit to the sequence control means 130 is maintained through contacts 123 of relay 120. The circuit to the timer is maintained through contacts 122 of relay 120 while the circuit to relay 110 is maintained through the series combination of contacts 111, 112 and 122.

Consequently, it may be seen that as long as neither power supply can provide output power to operate relay 120 that the timer 100 will remain energized. The continued operation of sequence control means 130 will alternately connect the output of the two power supplies to relay 120 in a futile effort to resume operation.

After a predetermined time interval timer 100 will open its associated contacts 102 and 103 which are effective to open the circuit to sequence control means 130 and relay 110 to cease the fruitless operation of the sequence control means 130.

Operation may be resumed, after the maintenance personnel have repaired the difficulty which made both power supplies inoperative, by a momentary operation of switch S3 which restores timer 100 to normal.

All transfers have been described in terms of transferring from power supply P1 to power supply P2. An examination and consideration of the techniques of the foregoing specification when considered in conjunction with the timing chart of Fig. 2 should serve to make it evident that the transfer may take place from power supply P2 to power supply P1 with equal facility.

While there has been shown and described what is presently considered to be the preferred embodiment of the invention, various modifications will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a power supply system of the type having first and second power supplies with respective output terminals to be selectively connected to a load singly or in parallel, the switching system comprising first switch means operative to selectively connect the output terminals of said first power supply to the load, second switch means operative to selectively connect the output terminals of said second power supply to the load, control means to operate said first and second switch means singly and in combination to selectively connect the output terminals of said power supplies to the load singly or in parallel, respectively, voltage responsive means, means to selectively connect said voltage responsive means to the output terminals of either of said power supplies, and means responsive to the voltage responsive means being connected to the one of said power supplies not connected to the load when the output terminals of the other of said power supplies is singly connected to the load for operating said control means in a manner to permit connection of the output terminals of both of said power supplies to the load in parallel only when the voltage connected to the voltage responsive means from said one of said power supplies is above a predetermined amplitude.

2. In a power supply system of the type having first and second power supplies with respective output terminals to be selectively connected to a load singly or in parallel, the switching system comprising first switch means operative to selectively connect the output terminals of said first power supply to the load, second switch means operative to selectively connect the output terminals of said second power supply to the load, control means to operate said first and second switch means singly and in combination to selectively connect the output terminals of said power supplies to the load singly or in parallel, respectively, voltage responsive means, means to selectively connect said voltage responsive means to the output terminals of either of said power supplies, means responsive to the voltage responsive means being connected to the one of said power supplies not connected to the load when the output terminals of the other of said power supplies is singly connected to the load for operating said control means in a manner to permit connection of the output terminals of both of said power supplies to the load in parallel only when the voltage connected to the voltage responsive means from said one of said power supplies is above a predetermined amplitude, and means for said control means responsive to the operation of said voltage responsive means to operate said first and second switch means to another combination to singly connect the output terminals of said one of said power supplies to the load when the output terminals of said power supplies have been connected to the load in parallel and to singly connect the output terminals of said other of said power supplies to the load when the output terminals of said power supplies have not been connected to the load in parallel.

3. In a power supply system of the type having first and second power supplies with respective output terminals to be selectively connected to a load singly or in parallel, the switching system comprising first switch means operative to selectively connect the output terminals of said first power supply to the load, second switch means operative to selectively connect the output terminals of said second power supply to the load, sequence control means to sequentially operate said first and second switch means in various combinations to selectively connect the output terminals of said first and second power supplies to the load singly or in parallel including a first combination of connections of said first and second switch means for connecting the output terminals of one of said power supplies to the load while the output terminals of said other power supply is not connected to the load, a second combination of connections of said first and second switch means for connecting the output terminals of said other power supply to the load while the output terminals of said one power supply is not connected to the load, and a third combination of connections of said first and second switch means for connecting the output terminals of said first and second power supplies to the load in parallel, voltage responsive means, means to selectively connect said voltage responsive means to the respective output terminals of said first and second power supplies, means operated by said voltage responsive means to control the operation of said sequence control means to switch the connections from said first combination to said second combination when the voltage responsive means is connected to the output terminals of the power supply which is singly connected to the load and the voltage at the output terminals of said power supply is below a predetermined amplitude, and means operated by said voltage responsive means to control the operation of said sequence control means to switch the connections from said first combination to said third combination and then to said second combination when the voltage responsive means is connected to the output terminals of the power supply which is not connected to the load and the voltage at said output terminals is above a predetermined amplitude.

4. In a power supply system of the type having first and second power supplies with respective output terminals to be selectively connected to a load singly or in parallel, the switching system comprising first switch means operative to selectively connect the output terminals of said first power supply to the load, second switch means operative to selectively connect the output terminals of said second power supply to the load, sequence control means to sequentially operate said first and second switch means in various combinations to selectively connect the output terminals of said first and second power supplies to the load singly or in parallel including a first combination of connections of said first and second switch means for connecting the output terminals of one of said power supplies to the load while the output terminals of said other power supply is not connected to the load, a second combination of connections of said first and second switch means for connecting the output terminals of said other power supply to the load while the output terminals of said one power supply is not connected to the load, and a third combination of connections of said first and second switch means for connecting the output terminals of said first and second power supplies to the load in parallel, voltage responsive means, means to selectively connect said voltage responsive means to the respective output terminals of said first and second power supplies, means operated by said voltage responsive means to control the operation of said sequence control means to switch the connections from said first combination directly to said second combination when the voltage responsive means is connected to the output terminals of the power supply which is singly connected to the load and the voltage at the output terminals of said power supply is below a predetermined amplitude, and means operated by said voltage responsive means to control the operation of said sequence control means to switch the connections from said first combination to said third combination and then to said second combination when the voltage responsive means is connected to the output terminals of the power supply which is not connected to the load and the voltage at said output terminals is above a predetermined amplitude.

5. In a power supply system of the type having first and second power supplies with respective output terminals to be selectively connected to a load singly or in parallel, the switching system comprising first switch means operative to selectively connect the output terminals of said first power supply to the load, second switch means operative to selectively connect the output terminals of said second power supply to the load, sequence control means to sequentially operate said first and second switch means in various combinations to selectively connect the output terminals of said first and second power supplies to the load singly or in parallel including a first combination of connections of said first and second switch means for connecting the output terminals of one of said power supplies to the load while the output terminals of said other power supply is not connected to the load, a second combination of connections of said first and second switch means for connecting the output terminals of said other power supply to the load while the output terminals of said one power supply is not connected to the load, and a third combination of connections of said first and second switch means for connecting the output terminals of said first and second power supplies to the load in parallel, means for operating said sequence control means, voltage responsive means, means to selectively connect said voltage responsive means to the respective output terminals of said first and second power supplies, means operated by said voltage responsive means to control the operation of said sequence control operating means to switch the connections from said first combination directly to said second combination when the voltage responsive means is connected to the output terminals of the power supply which is singly connected to the load and the voltage at the output terminals of said power supply is below a predetermined amplitude, means operated by said voltage responsive means to control the operation of said sequence control operating means to switch the connections from said first combination to said third combination and then to said second combination when the voltage responsive means is connected to the output terminals of the power supply which is not connected to the load and the voltage at said output terminals is above a predetermined amplitude, and means controlled by said voltage responsive means to control the sequence control operating means to prevent further operation of said first and second switch means when the output terminals to which said voltage responsive means is connected remains below a predetermined amplitude for a predetermined period of time.

References Cited in the file of this patent

UNITED STATES PATENTS 2,339,490   Langabeer _____ Jan. 18, 1944